United States Patent [19]
Takagi et al.

[11] Patent Number: 5,821,667
[45] Date of Patent: Oct. 13, 1998

[54] ULTRASONIC MOTOR

[75] Inventors: Tadao Takagi, Yokohama; Takatoshi Ashizawa, Kawasaki, both of Japan

[73] Assignee: Nikon Corporation, Tokyo, Japan

[21] Appl. No.: 950,734

[22] Filed: Oct. 15, 1997

Related U.S. Application Data

[63] Continuation of Ser. No. 642,207, May 6, 1996, abandoned, which is a continuation of Ser. No. 408,305, Mar. 22, 1995, abandoned.

[30] Foreign Application Priority Data

Mar. 23, 1994 [JP] Japan ................................. 6-051514
Nov. 9, 1994 [JP] Japan ................................. 6-275022

[51] Int. Cl.$^6$ ................................................... H02N 2/00
[52] U.S. Cl. ..................... 310/317; 310/316; 310/323; 310/328
[58] Field of Search ................................. 310/316, 317, 310/323, 328

[56] References Cited

U.S. PATENT DOCUMENTS

| | | | |
|---|---|---|---|
| 4,663,556 | 5/1987 | Kumada | 310/323 |
| 4,743,788 | 5/1988 | Takagi et al. | 310/316 |
| 4,812,697 | 3/1989 | Mishiro | 310/323 |
| 4,833,358 | 5/1989 | Suzuki et al. | 310/316 |
| 4,914,337 | 4/1990 | Takagi | 310/316 |
| 4,965,482 | 10/1990 | Ohnishi et al. | 310/323 |
| 5,061,882 | 10/1991 | Takagi | 310/316 |
| 5,073,739 | 12/1991 | Iijima et al. | 310/323 |
| 5,159,253 | 10/1992 | Shimizu et al. | 318/606 |
| 5,162,708 | 11/1992 | Naito et al. | 310/316 |
| 5,173,631 | 12/1992 | Suganuma | 310/316 |
| 5,200,665 | 4/1993 | Iijima | 310/323 |
| 5,448,128 | 9/1995 | Endo et al. | 310/323 |

FOREIGN PATENT DOCUMENTS

| | | | |
|---|---|---|---|
| 442 469 A1 | 8/1991 | European Pat. Off. | H02N 2/00 |
| 0 450 692 A2 | 10/1991 | European Pat. Off. | |
| 538 791 A1 | 4/1993 | European Pat. Off. | H01L 41/09 |
| 63-209482 | 8/1988 | Japan | H02N 2/00 |
| 0277477 | 11/1988 | Japan | 310/323 |
| 0055585 | 2/1990 | Japan | 310/323 |
| 3-183382 | 8/1991 | Japan | H02N 2/00 |
| 4-004772 | 1/1992 | Japan | H02N 2/00 |
| 5-091764 | 4/1993 | Japan | |

OTHER PUBLICATIONS

U.S. Application No. 08/391,565, Tadao Takagi et al. Filed Feb. 21; 1995 Assignee Nikon Corportion.
Piezoelectric Linear Motors for Application to Driving a Light Pick–up Element, papers of Lecture V of Dynamics Symposium Associated with Electromagnetic Force, Jun. 9, 1993, all page.
Ultrasonic Motors Theory and Applications, Clarendon Press, Oxford, 1993, all pages.

*Primary Examiner*—Thomas M. Dougherty

[57] ABSTRACT

An ultrasonic motor has a vibrator for vibrating with a first vibration mode and a second vibration mode for vibration in a direction different from that of the first vibration mode; a relatively movable member for executing relative vibration in accordance with the vibration of the vibrator; and a drive control device for controlling the vibrator within a range higher than, among resonance frequencies of the first and second vibration modes, a higher resonance frequency.

8 Claims, 15 Drawing Sheets

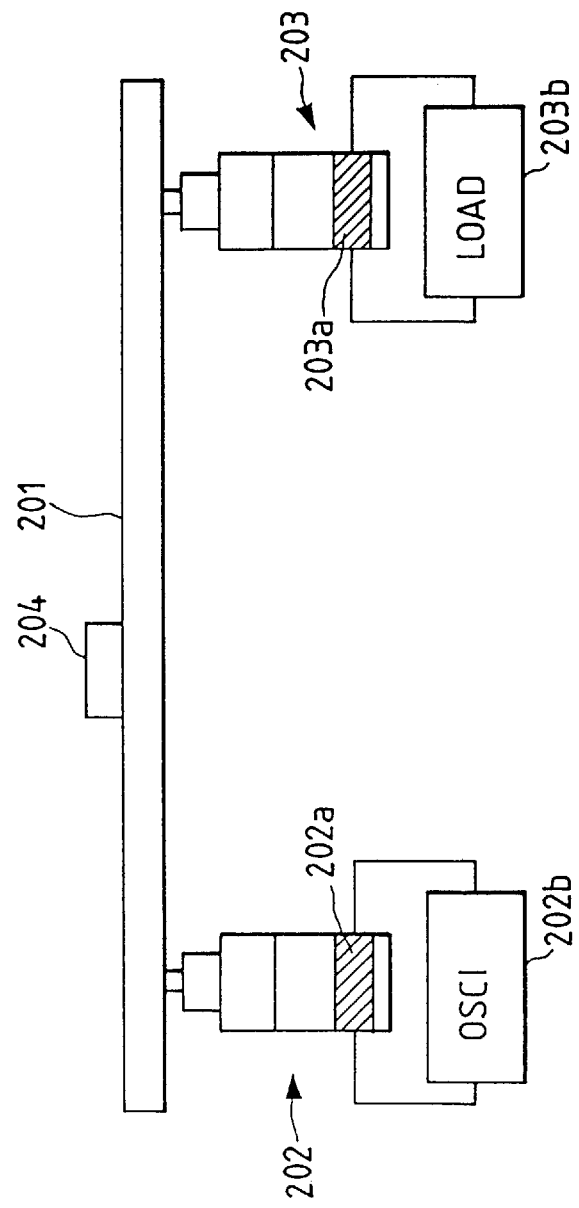

FIG. 12A  t=0
FIG. 12B  t=(1/4)π
FIG. 12C  t=(2/4)π
FIG. 12D  t=(3/4)π
FIG. 12E  t=(4/4)π
FIG. 12F  t=(5/4)π
FIG. 12G  t=(6/4)π
FIG. 12H  t=(7/4)π
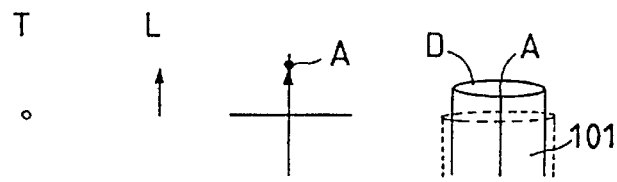
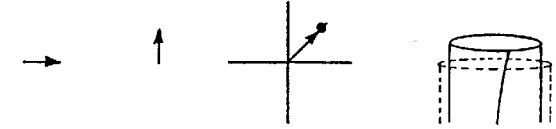
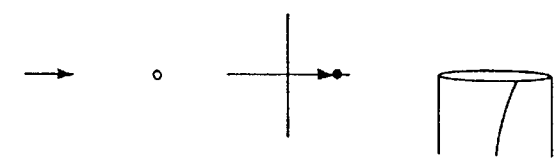
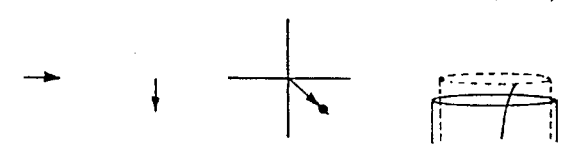
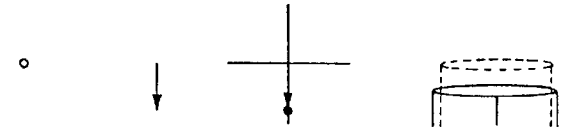
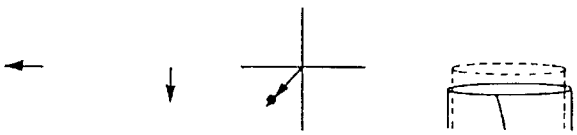
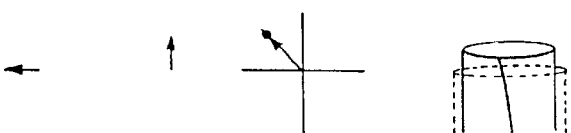

ULTRASONIC MOTOR

This application is a continuation of application Ser. No. 08/642,207, filed May 6, 1996, now abandoned, which is a continuation of application Ser. No. 08/408,305, filed Mar. 22, 1995, now abandoned.

BACKGROUND OF THE INVENTION

1. Field of the Invention

The present invention relates to an ultrasonic motor for generating relative motion between it and a relatively movable member by the use of different vibration modes such as a longitudinal vibration mode, a bending vibration mode, and more particularly to an ultrasonic motor whose drive control method is improved.

2. Related Background Art

FIG. 5 shows a conventional linear ultrasonic motor. The linear ultrasonic motor has a long elastic member 201. A transformer 202 for excitation is disposed on one end side of the long elastic member 201 and a transformer 203 for damping is disposed on the other end side thereof. Vibrators 202a, 203a are attached to the respective transformers 202, 203. When an alternating voltage is applied from an oscillator 202b to the vibrator 202a, the long elastic member 201 is vibrated and this vibration is transmitted through the long elastic member 201 to be a traveling wave. A movable member 204 pressed against the long elastic member 201 is driven by this traveling wave.

On the other hand, the vibration of the long elastic member 201 is transmitted via the transformer 203 to the vibrator 203a, by which the vibrational energy is converted into electrical energy. The electrical energy is dissipated by a load 203b connected to the vibrator 203a to absorb the vibration. The transformer 203 prohibits the traveling wave from being reflected by the end surface of the long elastic member 201 thereby to prevent the occurrence of a standing wave of a natural mode of the long elastic member 201.

In the ultrasonic motor of FIG. 5, the length of the long elastic member 201 is required for an amount corresponding to the moving range of the movable member 204 and the long elastic member 201 needs to be vibrated over the whole length.

Therefore, the apparatus becomes large and it is necessary to provide the transformer 203 so as to prevent the standing wave of the natural mode from occurring.

In order to solve such problems, various self-propelled ultrasonic motors have been proposed. For example, there is a known "plate motor of a degenerating longitudinal L1—bending B4 double-mode" described in "222 a piezoelectric linear motor for light pick-up movement lecture paper presented at the 5th dynamics symposium regarding electromagnetic force"

FIGS. 6A to 6C are front, side and plan views of a conventional plate motor of a degenerating longitudinal L1—bending B4 double-mode respectively.

An elastic member 1 is constituted of a base portion 1a and projected portions 1b, 1c formed on one surface of the base portion 1a. Piezoelectric elements 2, 3 are attached to the opposite surface of the base portion 1a to generate a longitudinal vibration L1 mode and a bending vibration B4 mode.

The projected portions 1b, 1c of the elastic member 1 are provided on the position of the loop of the bending vibration B4 mode generated in the base section 1a, and pressed against a relatively movable member (not shown) to execute relative motion.

However, in the motor in FIGS. 6A to 6C, vibrations of the above-mentioned two modes are generated, so if a conventional ultrasonic motor drive circuit (e.g., in Japanese Patent Application Laid-Open No. 63-209482) which generates a traveling wave by superposing identical vibration modes is utilized for the motor, stable drive control cannot be performed.

More specifically, in performing speed control by changing the frequency of an input frequency voltage, depending on the selection of the range of the frequency, the motor might be unable to be driven when the load is changed.

FIG. 17 is an exploded view of a conventional longitudinal and torsional vibration type ultrasonic actuator.

A stator 301 of the ultrasonic actuator has two cylindrical vibrators 302, 303, two piezoelectric elements 304 for torsional vibration interposed between the vibrators 302 and 303, and a piezoelectric element 305 for longitudinal vibration disposed on the vibrator 303. The piezoelectric elements 304 for torsional vibration are polarized in its circumferential direction while the piezoelectric element 305 for longitudinal vibration is polarized in its thickness direction. Further, a rotor 306 is disposed on the piezoelectric element 305 for longitudinal vibration.

The vibrators 302, 303 and the piezoelectric elements 304, 305 are secured to a shaft 307 (engaged with screw portion of the shaft 307). The rotor 306 is provided so as to be rotatable around the shaft 307 via a ball bearing 308. A nut 310 is engaged with an end portion of the shaft 307 via a spring 309, whereby the rotor 306 is pressed against the stator 301.

The piezoelectric elements 304 for torsional vibration and the piezoelectric element 305 for longitudinal vibration are driven by controlling the phase of the voltage of the same frequency from an oscillator 311 by means of a phase device 312.

The piezoelectric elements 304 for torsional vibration serve to impart mechanical displacement to the stator 301 to rotate the rotor 306. The piezoelectric element 305 for longitudinal vibration serves to periodically change frictional force produced between the stator 301 and the rotor 306 in synchronism with the period of torsional vibration due to the piezoelectric elements 304 thereby to transform the vibration into motion in one direction.

FIG. 18 is a perspective view of the ultrasonic actuator.

As the piezoelectric element 304 for torsional vibration is required to polarize in the circumferential direction, a piezoelectric material is once divided into about six or eight fan-shaped segments. Then, the segments are each polarized and combined again into a ring shape. A reference numeral 304a is an electrode.

However, in the conventional ultrasonic actuator, when combining the fan-shaped segments into the piezoelectric element for torsional vibration in the ring shape, it is difficult to obtain high configuration accuracy.

On the other hand, each cross-sectional area of the piezoelectric element for longitudinal vibration and the piezoelectric elements for torsional vibration is approximately equal to or less than that of the stator. Also, it is necessary to provide holes in central portions of the piezoelectric elements so as to insert the shaft through the holes. Therefore, each cross-sectional area of the piezoelectric elements becomes much smaller, making it difficult to obtain high torque and high rotation speed.

In order to solve such problems, the applicant of the present invention has proposed a longitudinal and torsional vibration type ultrasonic actuator which has a simple structure and can be driven with high torque and at high rotation speed (Japanese Patent Application No. 6-180279).

A stator of the actuator has two thick semicylindrical elastic members and electromechanical converting elements for torsional vibration and longitudinal vibration sandwiched between the semicylindrical elastic members (see FIGS. 11A and 11B). A rotor is disposed on an end surface (drive surface) of the stator so as to be rotatable around a shaft, and pressed against the drive surface.

When the electromechanical converting elements are excited by drive signals, longitudinal vibration and torsional vibration are generated in the elastic members. When the resonance frequency of the longitudinal vibration approximately coincides with that of the torsional vibration, the longitudinal vibration and the torsional vibration are generated simultaneously (degeneration), whereby elliptic motion occurs on the drive surface to produce drive force to rotate the rotor.

In the above longitudinal and torsional type ultrasonic actuators, the longitudinal vibration serves as a clutch between the stator and the rotor while the torsional vibration serves to impart rotational force to the rotor. Therefore, the rotor is driven in the vicinity of the resonance frequency of the torsional vibration.

FIG. 16 is a graph of waveforms for explaining a case where the resonance frequencies of the longitudinal and torsional vibrations of the longitudinal and torsional vibration type ultrasonic actuator are deviated from each other.

In this ultrasonic actuator, when the resonance frequency $\omega_{OL}$ of the longitudinal vibration is larger than the resonance frequency $\omega_{OT}$, a frequency producing torsional vibration and driving the rotor might become lower than the resonance frequency of the longitudinal vibration.

This ultrasonic actuator can be driven steadily with a frequency higher than the resonance frequencies, but cannot be driven steadily with a frequency lower than the resonance frequencies. Therefore, while the ultrasonic actuator is being driven with a frequency in a drive frequency domain of the torsional vibration, if the frequency is lower than the resonance frequency $\omega_{OL}$, the longitudinal vibration cannot serve as a clutch between the stator and the rotor. Therefore, the rotational motion becomes unstable, causing the drive force and the drive efficiency to be lowered.

On the other hand, in such an ultrasonic actuator, generally, the resonance frequency $\omega_{OL}$ of the longitudinal vibration and the resonance frequency $\omega_{OT}$ of the torsional vibration are designed to coincide with each other.

However, the resonance frequencies of the longitudinal and torsional vibrations might be deviated from each other due to the influence of processing accuracy of the elastic members, etc., causing the resonance frequency of the longitudinal vibration to be higher than that of the torsional vibration, and vice versa.

Accordingly, among manufactured ultrasonic actuators, there are ones which cannot be driven steadily. Thus, the difference of performance of the ultrasonic actuators occurs.

SUMMARY OF THE INVENTION

It is an object of the present invention to provide an ultrasonic motor in which stable drive control can be performed by the use of different vibration modes.

It is another object of the present invention to provide an ultrasonic actuator capable of obtaining stable drive, improving drive force and drive efficiency, and reducing the variation of performance.

In order to achieve the above objects, in an ultrasonic motor of the present invention for producing relative motion between the motor and a relatively movable member by the use of vibrations of different first and second vibration modes, drive control means is provided to control the motor in a range higher than, among resonance frequencies of the first and second vibration modes, a higher resonance frequency.

According to a preferred embodiment of the present invention, in an ultrasonic motor having an elastic member and an electromechanical converting device attached to the elastic member wherein a longitudinal vibration mode and a bending vibration mode are produced in the elastic member by means of the electromechanical converting device, and those vibrations are composed to produce elliptic motion to cause relative motion to occur between the motor and a relatively movable member, drive control means is provided to control the motor at a frequency within a range higher than, among resonance frequencies of the longitudinal and bending vibration modes, a higher resonance frequency.

The drive control means changes the frequency from a high frequency toward a low frequency at the time of driving the motor.

The drive control mean includes a phase difference detecting section for outputting a phase difference detecting signal in accordance with the phase difference between the input voltage and a monitored voltage; a target phase difference setting section for outputting a target phase difference signal corresponding to a target output; and a phase difference control section for comparing the outputs of the phase difference detecting section and the target phase difference setting section and controlling the phase difference detecting signal so as to approach the target phase difference signal. The target phase difference setting section sets the target phase difference signal to be within a range higher than a resonance point of the higher resonance frequency among the resonance frequencies of the vibration modes.

According to the present invention, when producing relative motion between the motor and the relatively movable member by the use of the different first and second modes, e.g., the longitudinal vibration mode and the bending vibration mode, the motor is controlled at a frequency within the range higher than the higher resonance frequency among the resonance frequencies of the different vibrations. Therefore, the motor will not be stopped due to fluctuations of the load, enabling stable drive thereof.

According to another preferred embodiment of the present invention, in an ultrasonic actuator having an electromechanical converting device for converting electrical energy into mechanical energy and being excited by a drive signal; an elastic member attached to the electromechanical converting device for producing drive force on its drive surface due to the occurrence of n-th longitudinal vibration and m-th torsional vibration caused by the excitation of the electromechanical converting device; a relatively movable member for executing relative motion with respect to the elastic member; and a drive circuit for outputting the drive signal to the electromechanical converting device, the resonance frequency of the m-th torsional vibration is made higher than that of the n-th longitudinal vibration.

The n-th longitudinal vibration is a first longitudinal vibration, while the m-th torsional vibration is a first or second torsional vibration.

The drive circuit outputs the drive signal within a range higher than the resonance frequency of the m-th torsional vibration.

According to the present invention, the electromechanical converting device is excited by drive vibration to produce n-th longitudinal vibration and m-th torsional vibration, whereby elliptic motion occurs on the drive surface. Accordingly, drive force is generated between the elastic member and the relatively movable member made in contact with the elastic member. When the elastic member constitutes a stator, the relatively movable member becomes a rotor and is driven. On the other hand, when the relatively movable member constitutes a stator, the elastic member becomes a rotor and is driven.

At this time, as the resonance frequency of the m-th torsional vibration is made higher than that of the n-th longitudinal vibration, it is possible to drive the actuator constantly in the vicinity of the higher resonance frequency among the two resonance frequencies, preventing the drive force and drive efficiency from being lowered.

Also, when the resonance frequency of the m-th torsional vibration is designed to be higher than that of the n-th torsional vibration, even though the resonance frequencies are deviated from predetermined values due to the processing tolerance, the resonance frequency of the longitudinal vibration will not be higher than that of the torsional vibration, making it possible to reduce the variation in performance of formed actuators.

Further, as the n-th longitudinal vibration is the first longitudinal vibration and the m-th torsional vibration is the first torsional vibration, it is possible to make each vibration amplitude of the vibrations large, enabling the drive force to be improved.

Furthermore, since the actuator is driven at a frequency within the range higher than the resonance frequency of the m-th torsional vibration, it is possible to drive the actuator constantly in the vicinity of the higher frequency among the two resonance frequencies.

BRIEF DESCRIPTION OF THE DRAWINGS

FIG. 5 is a diagram showing a conventional linear ultrasonic motor;

FIGS. 12A to 12H are diagrams for explaining a drive principle of producing elliptic motion on the drive surface of the elastic members by combining the longitudinal vibration and the torsional vibration of the elastic members of the ultrasonic actuator of FIG. 7;

DESCRIPTION OF THE PREFERRED EMBODIMENTS

Figure 1A:
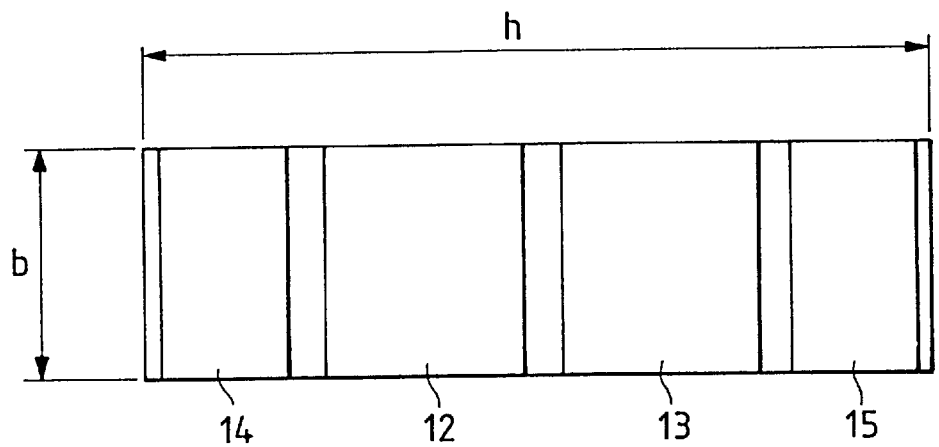
FIGS. 1A to 1C are schematic diagrams showing an ultrasonic motor according to an embodiment of the present invention.
Figure 1B:
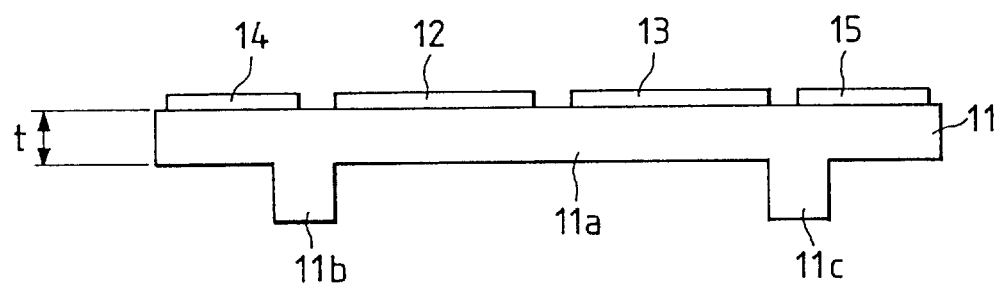
Figure 1C:
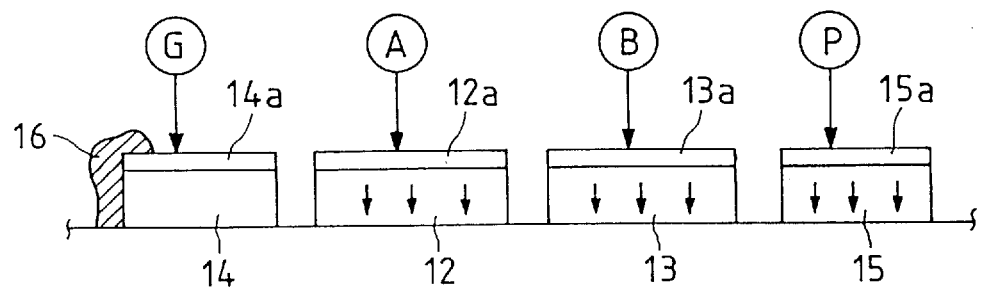

Embodiments of the present invention will be described with reference to the accompanying drawings now. FIGS. 1A to 1C show an ultrasonic motor according to an embodiment of the present invention.

An elastic member 11 has a base portion 11a, and two projected portions 11b, 11c and is formed of metal such as stainless steel or aluminum alloy or plastics. In this embodiment, the thickness, length and width of the elastic member 11 are represented by t, h and b respectively.

Piezoelectric elements 12 to 15 are adhered to the upper surface of the base portion 11a of the elastic member 11. The piezoelectric elements 12, 13 are elements for generating a longitudinal vibration L1 mode and a bending vibration B4 mode. Electrodes 12a, 13a are printed on the upper surfaces of the piezoelectric elements 12, 13. The voltage of an A-terminal is applied via the electrode 12a to the piezoelectric element 12 while the voltage of a B-terminal is applied via the electrode 13a to the piezoelectric element 13.

In this embodiment, as shown in FIG. 1C, the piezoelectric elements 12, 13 are polarized in the thickness direction and their polarization directions are the same. Also, the frequencies of the voltages of the A- and B-terminals are the same and the phases thereof are shifted $\pi/2$ from each other. The piezoelectric elements 12, 13 may be polarized in opposite directions.

An electrode 14a is printed on the upper surface of the piezoelectric element 14 and it is connected electrically to the elastic member 11 by means of conductive coating 16. The surfaces of the piezoelectric elements 12, 13 opposite to those of the elements 12, 13 to which the electrodes 12a, 13a are attached are equipotential to the elastic members 11 and their electric potential is transmitted via the conductive coating 16 and the electrode 14a to a G-terminal. It is preferable not to subject the piezoelectric element 14 to poling in order to prevent the lowering of the drive force and the performance difference in the drive direction.

An electrode 15a is printed on the upper surface of the piezoelectric element 15. The vibration state of the elastic member 11 is converted into an electric signal by the piezoelectric element 15 and the electric signal is sent to a P-terminal via the electrode 15a. This electric signal includes the vibration state of a fourth bending vibration mode and that of a first longitudinal vibration mode in a degenerate form, and approximately corresponds to the composite vibration amplitude of the elastic member 11.

FIGS. 2A to 2D are diagrams for explaining the operation of the ultrasonic motor of the present invention.

Figure 2D:
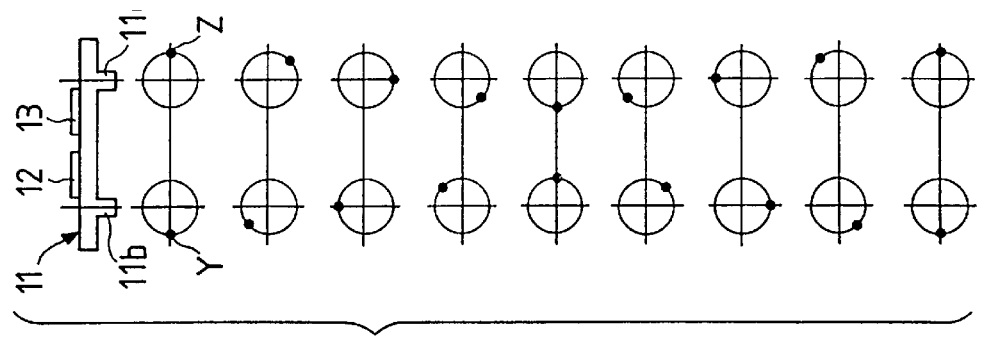
FIGS. 2A to 2D are diagrams for explaining the drive operation of the ultrasonic motor.
Figure 2C:
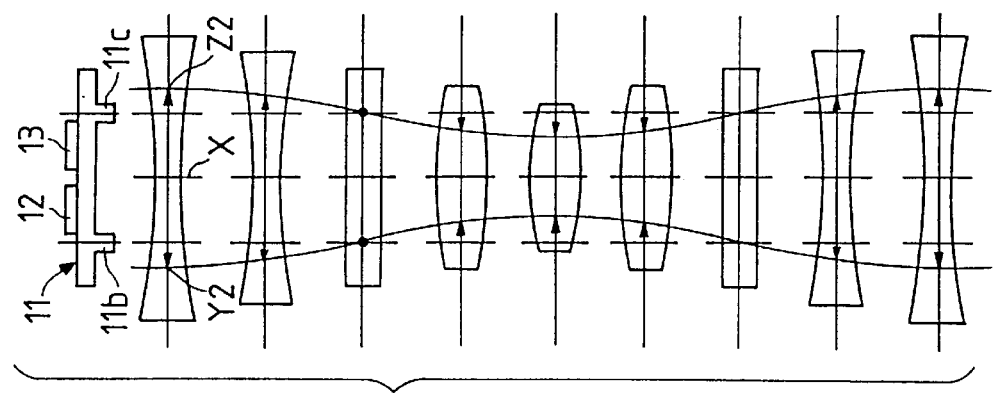
Figure 2B:
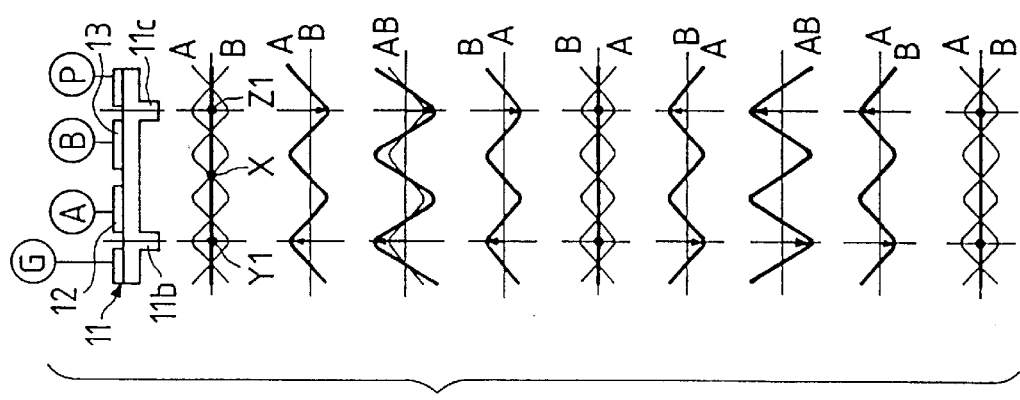
Figure 2A:
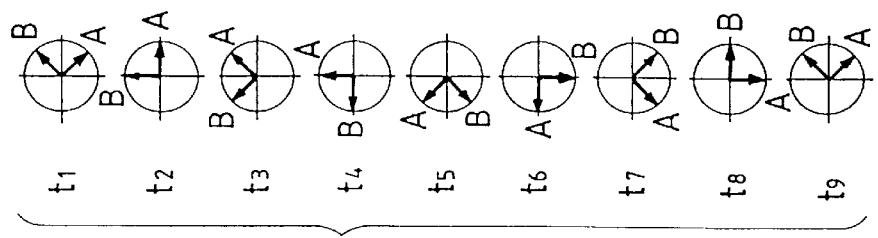

FIG. 2A shows changes of two-phase high frequency voltages A, B input to the ultrasonic motor with time (t1 to t9). The horizontal axis of FIG. 2A indicates the effective value of the high frequency voltage. FIG. 2B shows the state of deformation of the cross section of the ultrasonic motor, and shows the change of the bending vibration produced in the ultrasonic motor with time (t1 to t9). FIG. 2C shows the state of deformation of the cross section of the ultrasonic motor, and shows the change of the longitudinal vibration produced in the ultrasonic motor with time (t1 to t9). FIG. 2D shows the change of the elliptic motion produced in the projected portions 11b, 11c of the ultrasonic motor with time (t1 to t9).

Next, the operation of the ultrasonic motor of this embodiment will be described with time (t1 to t9).

At the time t1, as shown in FIG. 2A, the high frequency voltage A is a positive voltage, and the high frequency voltage B is the same but positive voltage. As shown in FIG. 2B, bending motions due to the high frequency voltages A and B cancel each other, so the amplitude of material points Y1 and Z1 becomes zero. Also, as shown in FIG. 2C, a longitudinal vibration due to the high frequency voltages A, B occurs in a direction of extension. As indicated by arrows, the distance between material points Y2 and Z2 is extended maximally with a node X as the center. As a result, as shown in FIG. 2D, the bending and the longitudinal vibrations are composed, and the composition of the motions of the material points Y1 and Y2 becomes the motion of a material point Y while the composition of the motions of the material points Z1 and Z2 becomes the motion of a material point Z.

At the time t2, as shown in FIG. 2A, the high frequency voltage B is zero, and the high frequency voltage A is a positive voltage. Then, as shown in FIG. 2B, a bending motion due to the high frequency voltage A occurs, and the material point Y is amplified in the positive direction while material point Z1 is amplified in the negative direction. Also, as shown in FIG. 2C, a longitudinal vibration due to the high frequency voltage A occurs and the distance between the material points Y2 and Z2 is shortened as compared with the state at the time t1. As a result, as shown in FIG. 2D, bending and longitudinal vibrations are composed, and the material points Y and Z move clockwise from the state at the time t1.

At the time t3, as shown in FIG. 2A, the high frequency voltage A is a positive voltage, and the high frequency voltage B is the same but negative voltage. As shown in FIG. 2B, bending motions due to the high frequency voltages A and B are composed and amplified, and the material point Y1 is amplified in the positive direction as compared with the state at the t2, showing a maximum positive amplitude. The material point Z1 is amplified in the negative direction as compared with the state at the time t2, showing a maximum negative amplitude. Also, as shown in FIG. 2C, longitudinal vibrations due to the high frequency voltages A and B cancel each other to cause the material points Y2 and Z2 to return to their original positions. As a result, as shown in FIG. 2D, the bending and longitudinal vibrations are composed, and the material points Y and Z move clockwise from the state at the time t2.

At the time t4, as shown in FIG. 2A, the high frequency voltage A is zero while the high frequency voltage B is a negative voltage. As shown in FIG. 2B, a bending motion due to the high frequency voltage B occurs, and the amplitude of the material points Y1 and Z1 becomes smaller than that at the time t3. Also, as shown in FIG. 2C, a longitudinal vibration due to the high frequency voltage B occurs, so the distance between the material points Y2 and Z2 is shortened. As a result, as shown in FIG. 2D, the bending and longitudinal vibrations are composed, and the material points Y and Z are moved clockwise from the state at the time t3.

At the time t5, as shown in FIG. 2A, the high frequency voltage A is a negative voltage, and the high frequency voltage B is the same negative voltage. As shown in FIG. 2B, bending motions due to the high frequency voltages A, B cancel each other, so that the amplitude of the material points Y1 and Z1 becomes zero. Also, as shown in FIG. 2C, a longitudinal vibration due to the high frequency voltages A, B occurs in the direction of contraction. As indicated by arrows, the distance between the material points Y2 and Z2 is shortened maximally with the node X as the center. As a result, as shown in FIG. 2D, the bending and longitudinal vibrations are composed, and the material points Y and Z move clockwise from the state at the time t4.

As the time elapses from t6 to t9, bending and longitudinal vibrations occur in the same manner as the above principle. As a result, as shown in FIG. 2D, the material points Y and Z move clockwise to execute elliptic motions.

Thus, in the ultrasonic motor, the drive force is taken out by producing elliptic motions at the ends of the projected portions 11a, 11b. Therefore, when a relatively movable member (not shown) is pressed against the ends of the projected portions 11b, 11c, the elastic member 11 is self-propelled with respect the relatively movable member.

Figure 3:
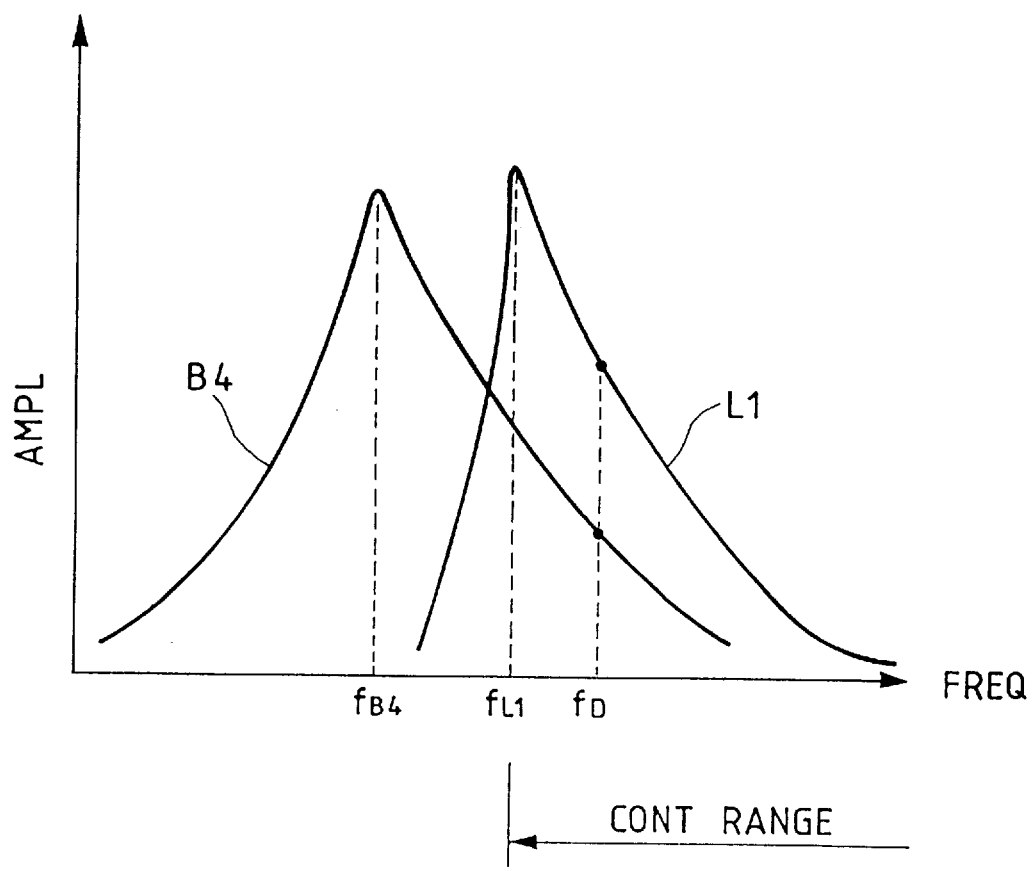
FIG. 3 is a graph showing the relationship between the frequency and the vibration amplitude of the ultrasonic motor.

FIG. 3 is a graph showing a relationship between the frequency and the vibration amplitude of the ultrasonic motor, and the horizontal axis indicates the frequency while the vertical axis indicates the vibration amplitude.

In the ultrasonic motor of this embodiment, the resonance frequency $f_{L1}$ of the first longitudinal vibration mode is set to be higher than the resonance frequency $f_{B4}$ of the fourth bending vibration mode. Its reason is as follows.

In general, the speed of an ultrasonic motor is controlled by changing the input frequency. At this time, when the motor is driven by a frequency lower than the resonance frequency, the motor might be unable to be driven or stopped when an overload is applied thereto. Therefore, it is necessary to drive the ultrasonic motor at a frequency equal to or higher than the resonance frequency.

However, in the ultrasonic motor of the present invention driven by utilizing the degeneration of the two kinds of vibration modes, i.e., the longitudinal vibration mode and the bending vibration mode, it is desirable to control the speed of the motor by changing an input frequency on the basis of the longitudinal vibration mode which contributes to the speed dominantly. At that time, when the bending vibration mode is driven at a frequency lower than the resonance frequency $f_{B4}$, the bending vibration is likely to be stopped.

Then, in this embodiment, the resonance frequency $f_{L1}$ of the first longitudinal vibration mode is set to be higher than the resonance frequency $f_{B4}$ of the fourth bending vibration mode.

Thereby, when the input frequency is set to be equal to or higher than the resonance frequency of the first longitudinal vibration mode, it will not be lower than the resonance frequency $f_{B4}$ of the fourth bending vibration mode, so that the motor can be driven constantly stably and will not be stopped even when an overload is applied thereto.

In order to make the resonance frequency $f_{L1}$ of the first longitudinal vibration mode higher than the resonance frequency $f_{B4}$ of the fourth bending vibration mode, the thickness t of the elastic member 11 (the vibration direction of the fourth bending vibration mode) is set to be comparatively thinner.

If the length, the modules of longitudinal elasticity and the density of the elastic member 11 are h, E and ρ respectively, the resonance frequency $f_{L1}$ of the first longitudinal vibration mode and the resonance frequency $f_{B4}$ of the fourth bending vibration mode are approximately expressed as:

$$f_{B4}=(14.137/2\ \pi L^2)\cdot(E/\rho)^{1/2}\cdot(t/12^{1/2})$$

$$f_{L1}=(\tfrac{1}{2}L)\cdot(E/\rho)^{1/2}$$

Thus, by setting the thickness t of the elastic member 11 to be comparatively thinner, it is possible to make the resonance frequency $f_{L1}$ of the first longitudinal vibration higher than the resonance frequency $f_{B4}$ of the fourth bending vibration mode. More precisely, it is desirable to obtain the resonance frequencies by taking into consideration the influence of the piezoelectric material such as a PZT, and the projected portions 11b, 11c.

Figure 4:
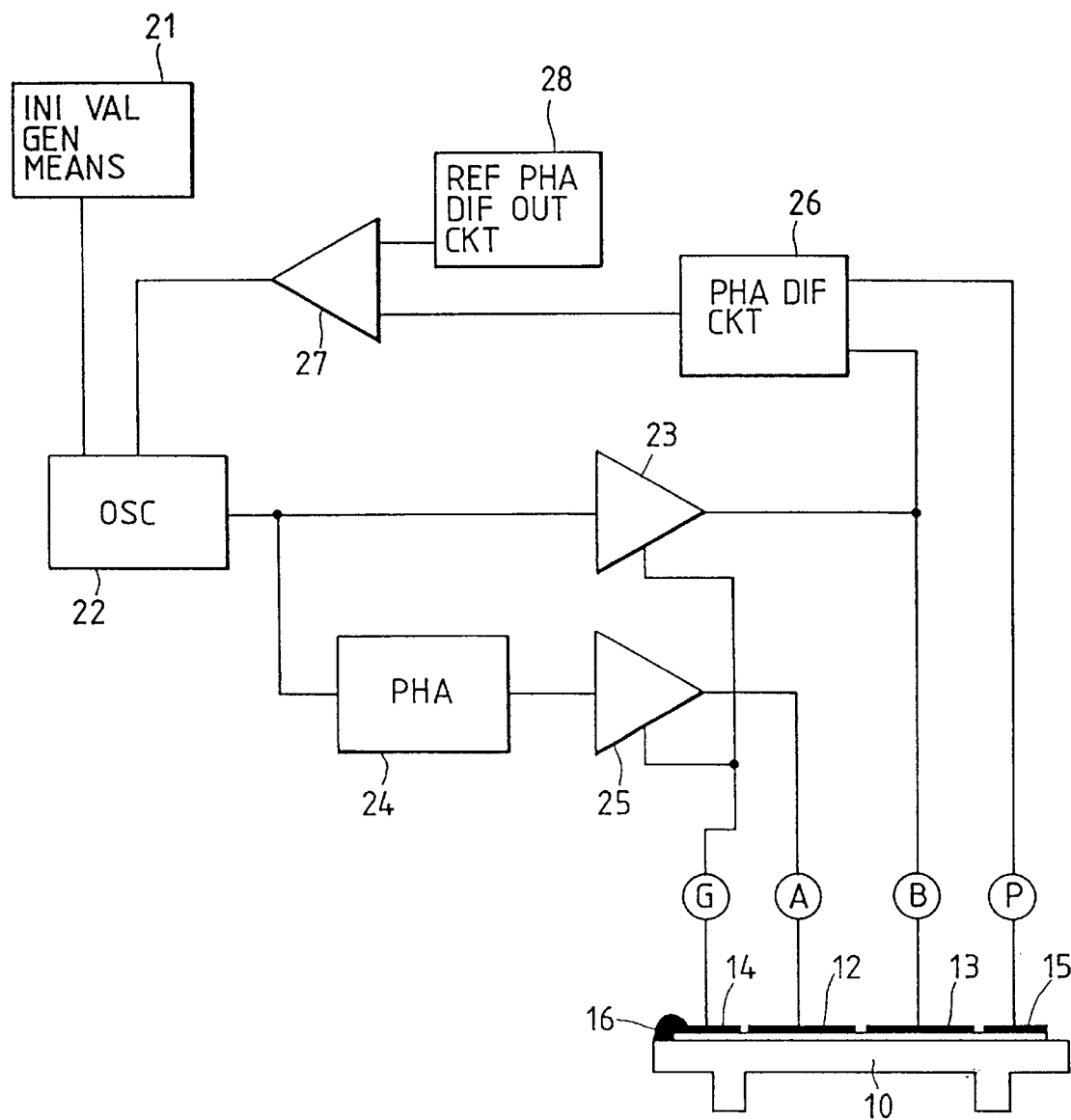
FIG. 4 is a block diagram showing the drive circuit of the ultrasonic motor.
Figure 6B:
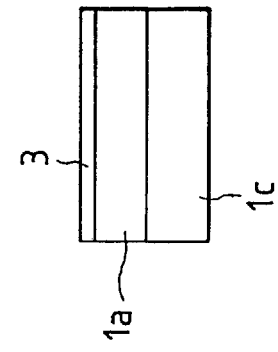
FIGS. 6A to 6C are schematic diagrams each showing a conventional plate motor of a degenerating longitudinal L1—bending B4 double-mode.
Figure 6C:
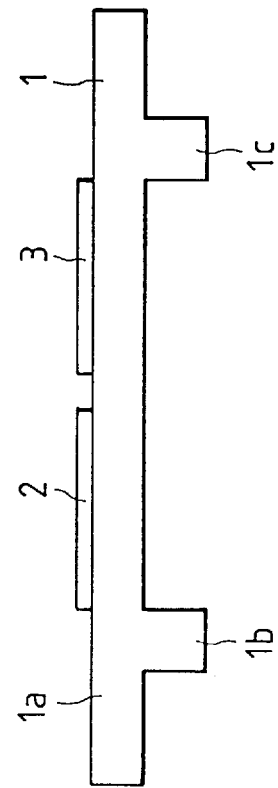
Figure 6A:
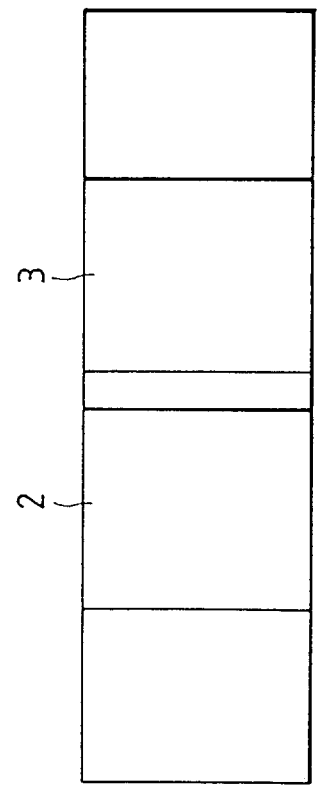

FIG. 4 is a block diagram showing the drive circuit of the ultrasonic motor of this embodiment.

When a power source is switched on and then an initial value generating means 21 receives instructions to drive the ultrasonic motor 10, it directs an oscillator 22 to oscillate at an initial frequency. This initial frequency is set to be sufficiently higher than the resonance frequency $f_{L1}$ of the first longitudinal vibration mode such that even though the resonance frequency $f_{L1}$ of the first longitudinal vibration mode is changed owing to the change of environmental temperature, the resonance frequency $f_{L1}$ will not be higher than the initial frequency.

The oscillator 22 oscillates at the initial frequency instructed from the initial value generating means 21. The output from the oscillator 22 is divided into two and one divided output is amplified by a first amplifier 23 and input to the electrode 13a of the piezoelectric element 13 as a B-layer voltage. Also, the other divided output is input to a phase shifter 24, shifted π/2 with respect to the B-layer voltage to be an A-layer voltage, and input to the electrode 12a of the piezoelectric element 12 via a second amplifier 25.

The B-layer voltage from the first amplifier 23 and the output of the P-terminal connected to the piezoelectric element 15 are input to a phase difference circuit 26, which obtains the phase difference between both voltages. The output from the phase difference circuit 26 is input to a comparator 27. The comparator 27 compares a reference phase difference set in a reference phase difference output circuit 28 and the output from the phase difference circuit 26, and outputs a signal corresponding to the difference between the two phase differences to the oscillator 22. The oscillator 22 changes the oscillation frequency such that the sent signal becomes zero. Thereby, the vibration amplitude of the ultrasonic motor is kept to be a predetermined value.

Since the reference phase difference of the reference phase difference output circuit 28 is set to a value corresponding to the control range ($\geq f_{L1}$) shown in FIG. 3, the oscillation frequency constantly becomes equal to or higher than the resonance frequency $f_{L1}$ of the first longitudinal vibration mode and will not be lower than the resonance frequency $f_{B4}$ of the fourth bending vibration mode. Therefore, it never occurs that the ultrasonic motor cannot be driven or its drive is stopped when an overload is applied thereto.

After the initial value generating means 11 instructs the oscillator 12 to oscillate at the initial frequency and the oscillator 12 is driven, the initial frequency is changed gradually into lower frequencies.

The present invention is not limited to the above embodiment and various modifications and changes can be taken.

For example, as an electromechanical converting device, the piezoelectric elements are described in the above embodiment, but it may be electrostrictive elements.

Also, instead of the L1–B4 mode, an L1–B2, L1–B6 or L2–B4 mode may be utilized. Further, as different vibration modes, examples of the longitudinal and bending vibrations are taken in the above embodiment, but two vibration modes of longitudinal and torsional vibrations may be adopted.

Furthermore, when utilizing more than two vibration modes, an ultrasonic motor is controlled within a range higher than the highest resonance frequency.

Although the ultrasonic motor of this embodiment is a self-propelled type, the elastic member is secured and a relatively movable long member may be moved.

As described above, according to the present invention, when making relative motion occur between the ultrasonic motor and relatively movable member by the use of the different vibration modes, the motor is controlled within the control range higher than the higher resonance frequency. Therefore, it never occurs that the motor happens to be stopped owing to fluctuations of load. Namely, the ultrasonic motor is driven constantly stably.

Figure 7:
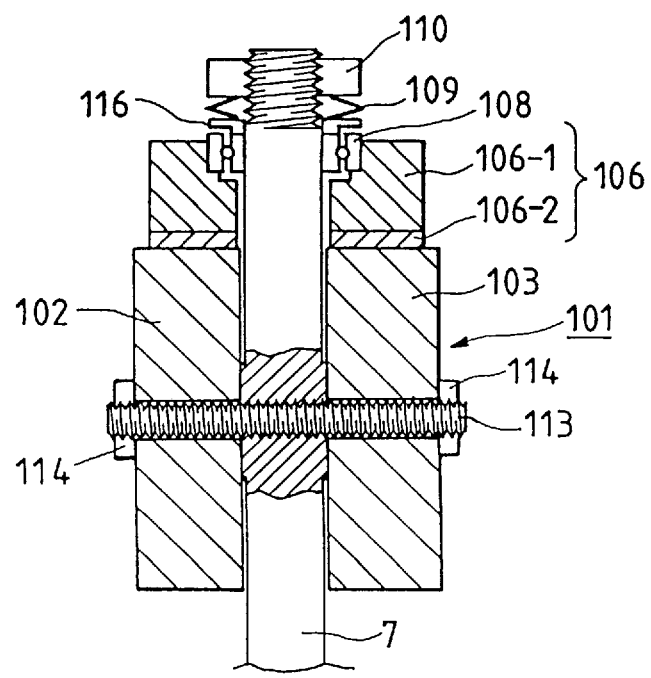
FIG. 7 is a sectional view showing an ultrasonic actuator according to an embodiment of the present invention.
Figure 8:
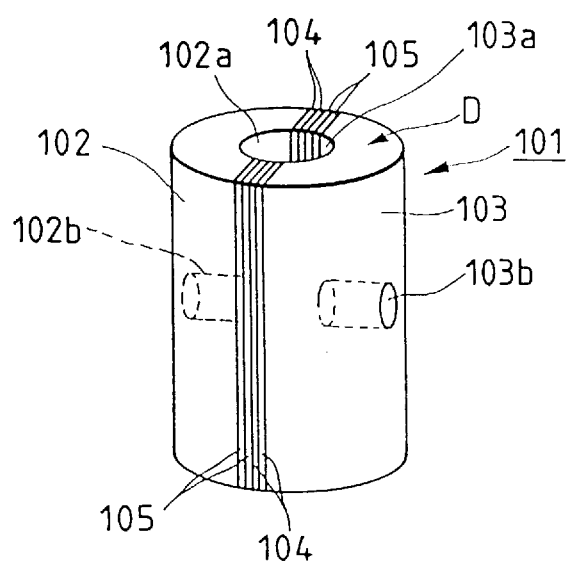
FIG. 8 is a diagram for explaining the rotor of the ultrasonic actuator of FIG. 7.

FIG. 7 is a sectional view of an ultrasonic actuator according to an embodiment of the present invention. FIG. 8 is a perspective view of a stator 101 of the ultrasonic actuator of FIG. 7.

The stator 101 has piezoelectric elements 104, 105 and elastic members 102, 103 to which the piezoelectric elements 104, 105 attached. The piezoelectric elements 104, 105 are an electromechanical converting elements which are excited by a drive signal to convert electrical energy into mechanical energy. Due to the excitation of the piezoelectric elements 104, 105, first longitudinal vibration and first torsional vibration are produced to cause drive force to occur on a drive surface D of the elastic members 102, 103.

The elastic members 102, 103 are approximately in the shape of a semicylinder as if a thick cylinder was divided into two, and the piezoelectric elements 104, 105 are interposed between them. The piezoelectric elements 104, 105 are formed of four layers in total. The piezoelectric elements 104 of two layers have a large piezoelectric constant $d_{15}$ and are provided to produce torsional vibration. The piezoelectric elements 105 of two layers also have a large piezoelectric constant $d_{31}$ and are provided to produce longitudinal vibration.

The elastic members 102, 103 are formed with penetrations 102b, 103b in the intermediate portions in the height direction in parallel with the direction of the layers formed by the piezoelectric elements 104, 105 (see FIG. 8). The elastic members 102, 103 are secured to a stationary shaft 107 inserted in the center of the axial direction by threading a bolt 113 into the penetrations 102b, 103b and tightening nuts 114, while the piezoelectric elements 104, 105 are sandwiched between the elastic members 102, 103.

A rotor 106 is constituted of a base member 106-1 and a slidable member 106-2 to be in contact with the drive surface D of the stator 101, and positioned with respect to the stationary shaft 107 by a positioning member 108 such as a bearing fitted on the inner surface of the rotor 106.

The rotor 106 is pressed against the drive surface D of the stator 101 by means of a pressure member 109 such as a velleville spring, spring or leaf spring.

The stationary shaft 107 is inserted through hallow portions 102a, 103a formed in the elastic members 102, 103 in the axial direction not only to secure the stator 101 formed of the elastic members 102, 103, etc. but also to position the rotor 6 in the radial direction. An end of the stationary shaft 107 has a screw portion on which an adjusting member 110 such as a nut for adjusting the amount of pressure of the pressure member 109 is fitted.

Figure 9A:
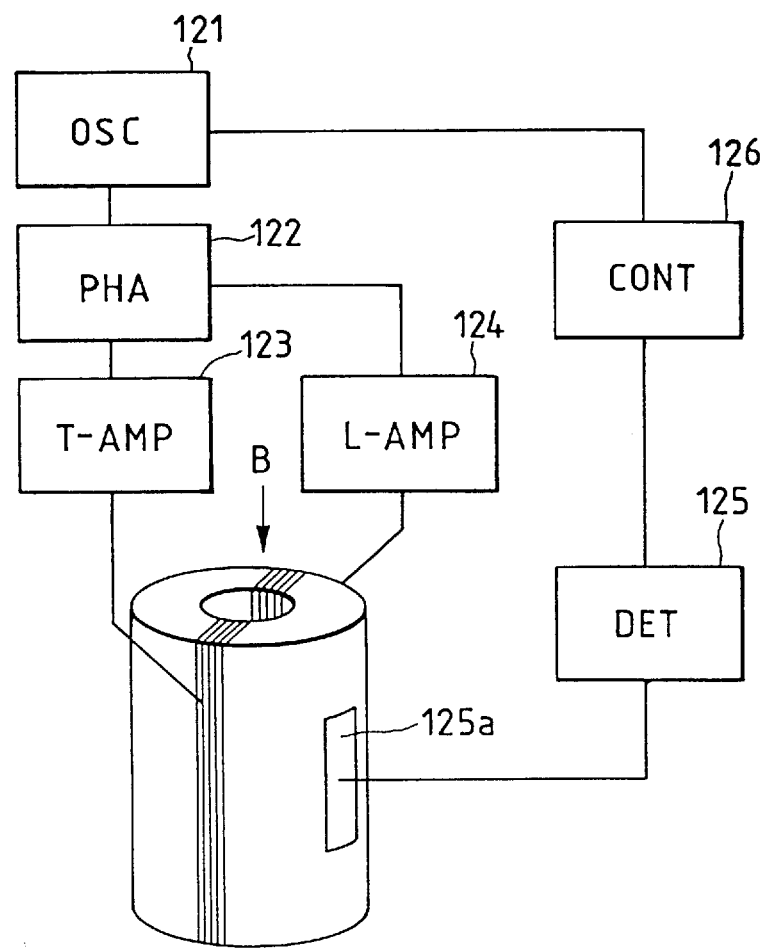
FIGS. 9A and 9B are diagrams showing a drive circuit of the ultrasonic actuator of FIG. 7.
Figure 9B:
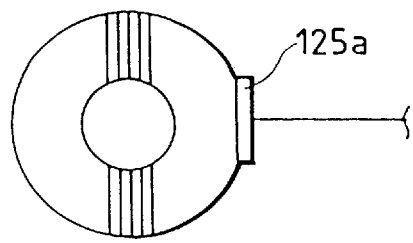

FIGS. 9A and 9B are diagrams for explaining a drive circuit of the ultrasonic actuator of this embodiment.

The drive circuit has an oscillator 121 for generating a drive signal, a phase shifter 122 for dividing the drive signal into two drive signals having the phase difference of $(1/4)\lambda$, a T-amplifier 123 for amplifying the drive signal to be input to the piezoelectric elements 104 for torsional vibration, and an L-amplifier 124 for amplifying the drive signal to be input to the piezoelectric elements 105 for longitudinal vibration.

Also, a control circuit has a detector 125 for detecting the torsional vibration, and a controller 126 for controlling the frequency and the voltage of the oscillator 121 in accordance with the amount of detection of the detector 125. The detector 125 is provided with a piezoelectric element 125a attached to a side surface of the stator 101 to indirectly detect the torsional displacement by detecting the displacement produced due to the torsion.

Next, a drive principle for producing elliptic motion on the drive surface of the ultrasonic actuator of this embodiment by combining the torsional vibration and the longitudinal vibration of the elastic members will be described.

Figure 11A:
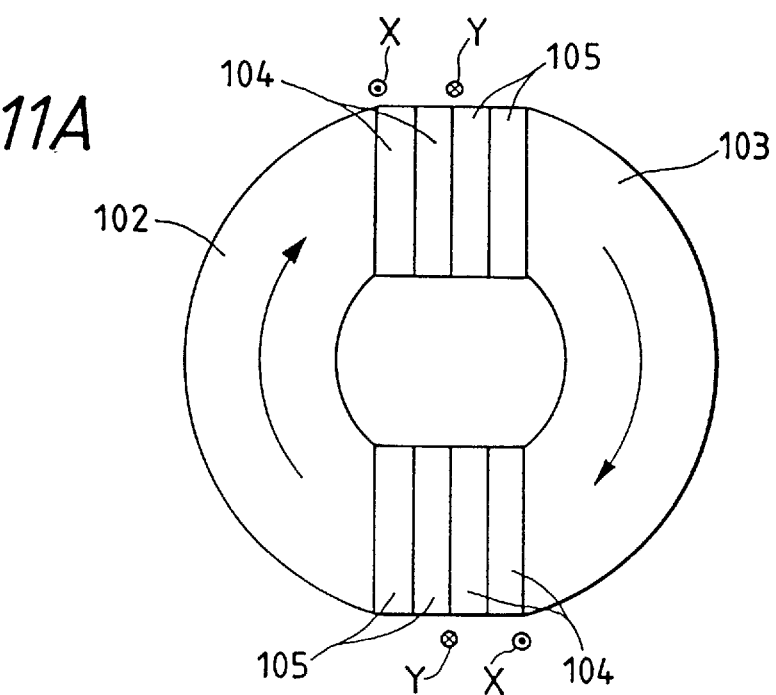
FIGS. 11A and 11B are diagrams for explaining the elastic members of the ultrasonic actuator of FIG. 7.
Figure 11B:
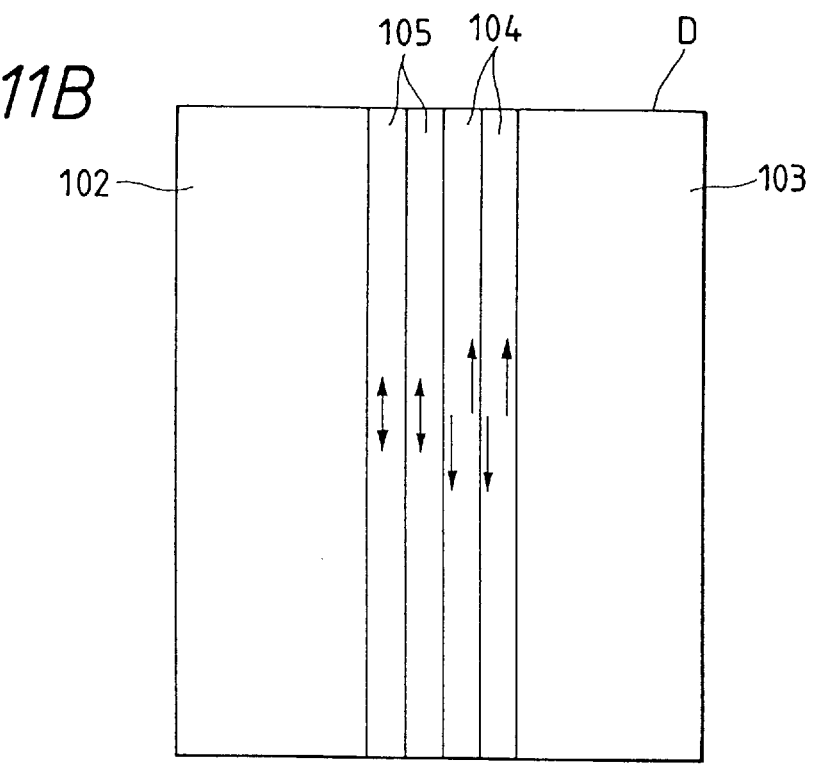

FIGS. 11A and 11B are bottom and side views of the stator of the ultrasonic actuator of this embodiment.

The piezoelectric elements 104, 105 constitute two groups sandwiched between the elastic members 102, 103. Each group of the piezoelectric elements 104, 105 has four layer in total. Among the four layers, two layers are formed of the piezoelectric elements 104 having the large piezoelectric constant $d_{15}$ while the other two layer are formed on the piezoelectric elements 105 having the large piezoelectric constant $d_{31}$.

The piezoelectric elements 104 have the large piezoelectric constant $d_{15}$ and produce shear displacement in the longitudinal direction of the elastic members 102, 103. As shown in FIG. 11A, the piezoelectric elements 104 are disposed in the circumferential direction such that shear deformation is produced alternately in the forward direction X and the backward direction Y. At this time, it is preferable that the positions of the shear deformation caused along the near side direction (X) and those caused along the for side direction (Y) are respectively point-symmetrical.

Due to this arrangement, when each group of the piezoelectric elements 104 undergoes shear deformation, torsional displacement occurs in the stator 101 to cause its bottom to be distorted.

The piezoelectric elements 105 have the large piezoelectric constant $d_{31}$ and produce expansion and contraction displacement in the longitudinal direction of the elastic members 102, 103. The four piezoelectric elements 105 for longitudinal vibration are disposed such that when a certain voltage is applied to all of them, displacement occurs in the same direction.

Thus, when utilizing the piezoelectric elements 104 for torsional vibration having the large piezoelectric constant $d_{15}$ and the piezoelectric elements 105 for longitudinal vibration having the large piezoelectric constant $d_{31}$, torsional motion occurs in the stator 101 by inputting a sinusoidal voltage to the piezoelectric elements 104 for torsional vibration, and expanding and contracting motion occurs in the stator 101 by inputting a sinusoidal voltage to the piezoelectric elements 105 for longitudinal vibration.

FIGS. 12A to 12H are explanatory diagrams for producing elliptic motion on the drive surface of the stator of the ultrasonic actuator of this embodiment by combining longitudinal vibration and torsional vibration.

As shown in FIGS. 12A to 12H, when the phase difference between the period of the torsional motion and the period of the expanding and contracting motion is $(1/4)\lambda$, elliptic motion occurs at a point A on the drive surface D.

At the time $t=(6/4)\pi$, the displacement of the torsional motion T is its maximum on the left side, and the displacement of the longitudinal vibration L is zero. In this state, the rotor 106 is made in contact with the drive surface D of the stator 101 by means of the pressure member 109.

From the time $t=(7/4)\pi$ to the time $t=(2/4)\pi$ through $t=$zero, the displacement of the torsional motion T changes from its maximum on the left side into its maximum on the right side, and the displacement of the longitudinal vibration L changes from zero into its maximum on the upper side and again returns to zero. Therefore, the point A on the drive surface D of the stator 101 rotates clockwise while pressing the rotor 106, whereby the rotor 106 is driven.

Next, from the time $t=(2/4)\pi$ to the time $t=(6/4)\pi$, the displacement of the torsional motion T changes from its maximum on the right side into its maximum on the left side, and the displacement of the longitudinal vibration L changes from zero its maximum on the lower side and returns again to zero. Therefore, the point A on the drive surface D of the stator 101 rotates counterclockwise while being detached from the rotor 106, so that the rotor 106 will no be driven. At this time, even though the rotor 106 is pressed by means of the pressure member 109, the rotor 106 cannot follow the contraction of the stator, as their natural frequencies are different.

When the vibration frequency of the torsional vibration is made to coincide with the resonance frequency thereof, the elliptic motion is magnified because of resonance. Approximations of the resonance frequencies of the torsional and longitudinal vibrations are expressed as:

$$\text{the frequency of the torsional vibration} = Ls \times (G/\rho)^2/2 \qquad (1)$$

$$\text{the frequency of the longitudinal vibration} = (Ls+Lr) \times (E/\rho)^2, \qquad (2)$$

wherein

Ls: the length of the stator in the longitudinal direction

Lr: the length of the rotor in the longitudinal direction

E : the modulus of longitudinal elasticity

G : the modulus of horizontal elasticity $\rho$: the density

According to the approximations (1) and (2), it is possible to make the resonance frequency of the torsional vibration coincide with that of the longitudinal vibration by adjusting the length of the stator 101 in the longitudinal direction. However, in the present invention, the length of the stator 101 in the longitudinal direction is adjusted such that the resonance frequency of the torsional vibration becomes higher than that of the longitudinal vibration.

(MANUFACTURE EXAMPLES)

Next, manufacture examples will be discussed.

The ultrasonic actuator using the longitudinal and torsional vibration double-mode degenerating type rotor were actually designed as follows. The stator 101 was formed of two different materials respectively for the elastic members 102, 103 and the piezoelectric elements 104, 105. Also, the rotor 106 was formed of a material different from that of the stator 101. Further, in order to enhance calculation accuracy, the resonance frequencies of the torsional and longitudinal vibrations were obtained by the finite element method.

| The elastic members 102, 103 | invar plate (nickel alloy iron) |
|---|---|
| The piezoelectric element 104 for torsional vibration | PZT with a thickness of 0.5 mm, $d_{15} = 510 \times 10^{-12}$ m/V |
| The piezoelectric element 105 for longitudinal vibration | PZT with a thickness of 0.5 mm $d_{31} = -135 \times 10^{-12}$ m/V |
| The rotor 106 | aluminum |

Manufacture Example 1

| The length of the elastic members 102, 103 | 20 mm |
|---|---|
| The length of the rotor 106 | 20.6 mm |
| The resonance frequency of the longitudinal vibration | 58.6 kHz |
| The resonance frequency of the torsional vibration | 59.1 kHz |

Manufacture Example 2

| The length of the elastic members 102, 103 | 20 mm |
|---|---|
| The length of the rotor 106 | 20 mm |
| The resonance frequency of the longitudinal vibration | 59.9 kHz |
| The resonance frequency of the torsional vibration | 59.1 kHz |

Thus, by adjusting the length of the rotor in the longitudinal direction, it was possible to make the resonance frequency of the torsional vibration higher than that of the longitudinal vibration.

Next, the operation of the ultrasonic actuator of this embodiment will be described.

The oscillator 121 generates a drive signal. The drive signal from the oscillator 121 is divided by the phase shifter 122 into two drive signals having the phase difference of $(1/4)\lambda$. The divided drive signals are amplified respectively by the T-amplifier 123 and the L-amplifier 124.

The drive signal amplified by the T-amplifier 123 is input to the piezoelectric elements 104 for torsional vibration, while the drive signal amplified by the L-amplifier 124 is input to the piezoelectric elements 105 for longitudinal vibration. Although the longitudinal vibration is produced directly by the piezoelectric elements 105 for longitudinal vibration, the torsional vibration is produced by the shear deformation of the piezoelectric elements 104 for torsional vibration.

It is impossible to form the stator thickly owing to the structure of the rotor, so that the amplitude of the torsional vibration might become smaller than that of the longitudinal vibration. Therefore, if the amplification rate of the T-amplifier 123 is made larger than that of the L-amplifier, the difference between the amplitude of the torsional vibration and the amplitude of the longitudinal vibration is lessened.

When the drive signals are input to the stator 101, first torsional vibration and first longitudinal vibration occur due to the excitation of the piezoelectric elements 104, 105, and elliptic motion composed of those vibrations occurs on the drive surface D of the stator 101. As the rotor 106 is pressed against the drive surface D of the stator 101, drive force is transmitted frictionally from the stator 101 to the rotor 106, which is then driven.

The detector 125 detects the amplitude of the torsional vibration of the stator 101 and outputs it to the controller 126. The drive speed and torque of the rotor 106 can be estimated by the amplitude of the stator 101. Therefore, the controller 126 controls the drive frequency and voltage of the oscillator 121 based on the detection result of the detector 125.

For example, when the amount of detection is larger than a predetermined value, the controller 126 increases the drive frequency or decreases the voltage. On the other hand, when the amount of detection is smaller than the predetermined value, the controller 126 decreases the drive frequency or increases the voltage.

Figure 10:
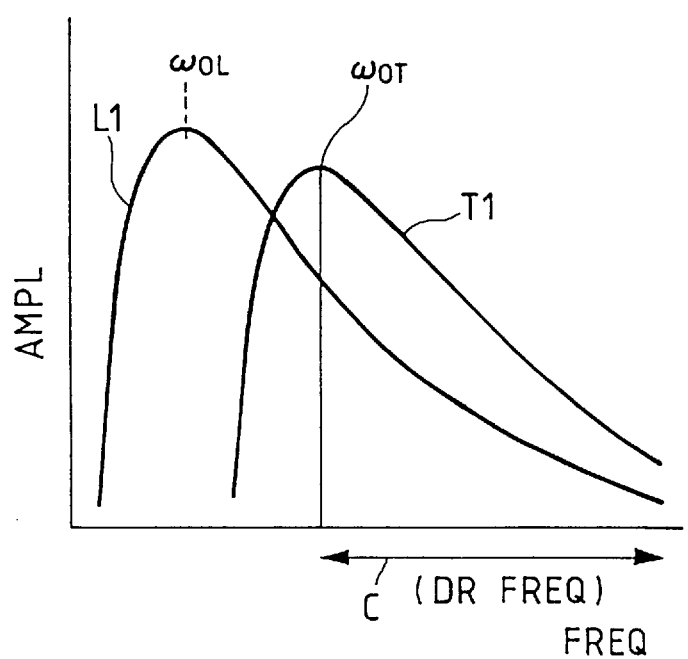
FIG. 10 is a graph showing the relationship between the resonance frequencies of longitudinal and torsional vibrations in the ultrasonic actuator of FIG. 7.

In this embodiment, the resonance frequency of the first torsional vibration is set to be higher than that of the first longitudinal vibration, each amplitude of the first torsional vibration and the first longitudinal vibration becomes as shown in FIG. 10.

The longitudinal vibration serves as a clutch between the stator 101 and the rotor 106, while the torsional vibration serves to impart rotational force to the rotor 106. Therefore, when the drive frequency domain is made higher than the resonance frequency of the torsional vibration and the stator is controlled within the drive frequency domain, the rotation speed and drive torque of the rotor 106 can be controlled preferably. Since the resonance point $\omega_{OL}$ of the longitudinal vibration is not located within the drive frequency domain C, the rotor can be driven stably, making it possible to improve the drive force and drive efficiency.

As compared with the conventional design method of making the resonance frequency of the longitudinal vibration coincide with that of the torsional vibration, there are following advantages. In the conventional method, due to the processing tolerance, there is a case where the resonance frequency of the longitudinal vibration<that of the torsional vibration, or a case where the resonance frequency of the longitudinal vibration>that of the torsional vibration. Particularly, in the latter case, the resonance point of the longitudinal vibration is located within the drive frequency domain, so that the constantly stable drive of the actuator cannot be obtained and the variation in performance of formed actuators occurs.

However, if an ultrasonic actuator is designed such that the resonance frequency of the longitudinal vibration<that of the torsional vibration as in the present invention, even though the resonance frequencies of the longitudinal and torsional vibrations are deviated from predetermined values such that the difference between them decreased, it is possible to achieve stable drive performance of the actuator within a range wherein the relationship that the resonance frequency of the longitudinal vibration<that of the torsional vibration is maintained. Therefore, the variation in performance of formed ultrasonic actuators due to the processing tolerance can be reduced as compared with the conventional ultrasonic actuator.

At this time, the amplitude of the longitudinal vibration tends to be larger than that of the torsional vibration, and even though the resonance frequency of the longitudinal vibration is kept apart form that of the torsional vibration to a certain extent, the elliptic motion can be produced on the drive surface of the stator and the rotor can be driven.

Figure 14:
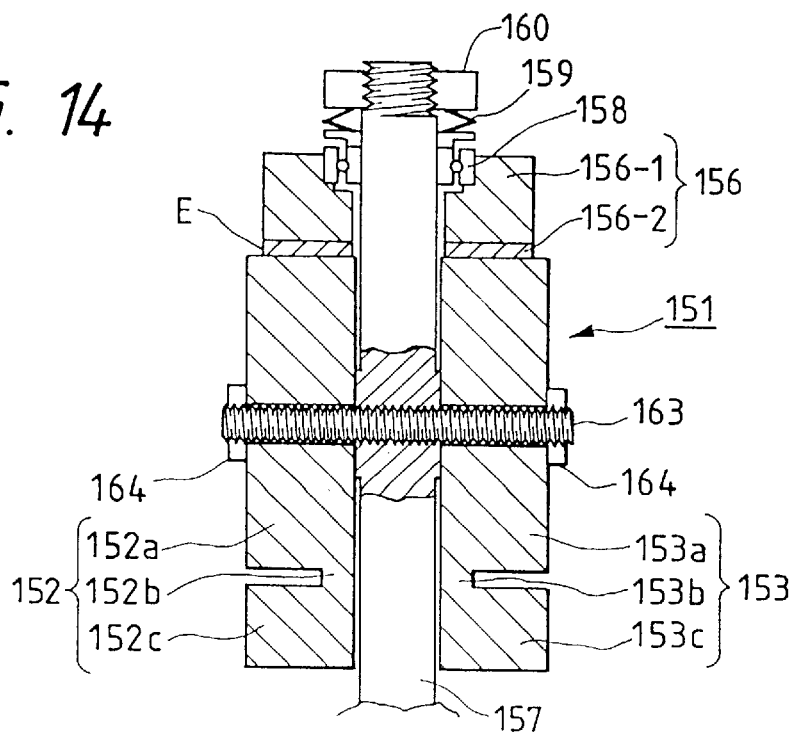
FIG. 14 is a sectional view of an ultrasonic actuator according to another embodiment of the present invention.

FIG. 14 is a sectional view of an ultrasonic actuator according to another embodiment of the present invention.

A stator 151 of the ultrasonic actuator has piezoelectric elements 154, 155 (see FIGS. 15A and 15B) and elastic members 152, 153 to which the piezoelectric elements 154, 155 are attached. The piezoelectric elements 154, 155 are an electromechanical converting device which is excited by drive signals. Due to the excitation of the piezoelectric elements, first longitudinal vibration and second torsional vibration occur to produce drive force on a drive surface E of the elastic members 152, 153.

The elastic members 152, 153 are almost in the shape of a semicylinder as if a thick cylinder were divided into two in the longitudinal direction, and have first thick portions 152a, 153a, second thick portions 152c, 153c, and thin portions 152b, 153b formed between the first and second thick portions. The piezoelectric elements 154, 155 are sandwiched between the elastic members 152, 153. The length of the first thick portions 152a, 153a is larger than that of the second thick portions 152c, 153c. The piezoelectric elements 154, 155 are formed of four layers in total. The piezoelectric elements 154 of the two layers are piezoelectric elements for torsional vibration having a large piezoelectric constant $d_{15}$, while the piezoelectric elements 155 of the two layers are piezoelectric elements for longitudinal vibration having a large piezoelectric constant $d_{31}$.

The elastic members 152, 153 are formed with penetrations approximately in their intermediate portions in the height direction in parallel with the direction of the layers formed by the piezoelectric elements 154, 155. The elastic members 152, 153 are fixed by threading a bolt 163 in the penetrations and fastening nuts 164, whereby the piezoelectric elements 154, 155 are sandwiched by the elastic members 152, 153, and the elastic members 152, 153 are secured to a stationary shaft 157 inserted in the center of the axial direction thereof.

A rotor 156 is constituted of a base member 156-1 and a slidable member 156-2 to be in contact with the drive surface of the stator 151, and is positioned with respect to the stationary shaft 157 by means of a positioning member 158 such as a bearing fitted on the inner surface of the rotor 156.

Also, the rotor 156 is pressed against the drive surface E of the stator 151 by means of a pressure member 159 such as a velleville spring, spring or leaf spring.

The stationary shaft 157 is inserted through a hollow portion formed in the elastic members 152, 153 in their axial direction not only to fix the stator 151 formed of the elastic members 152, 153, etc. but also to position the rotor 156 in its radial direction. The stationary shaft 157 has a screw portion on its end, and an adjusting member 160 such as a nut for adjusting an amount of pressure of the pressure member 159 is provided on the screw portion.

Figure 15A:
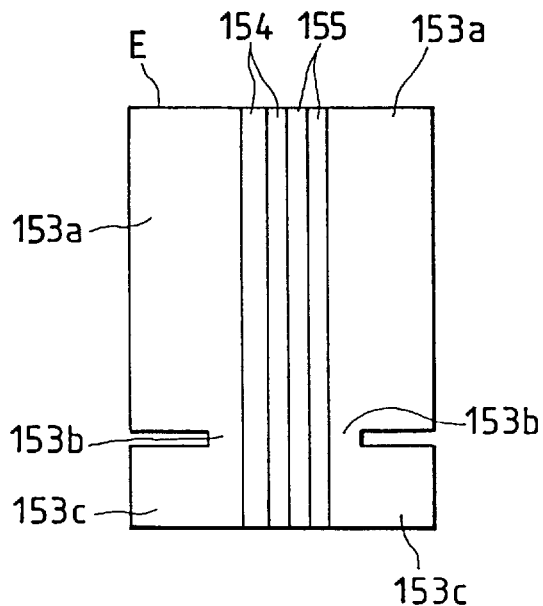
FIGS. 15A and 15B are diagrams for explaining vibration modes of the stator of the ultrasonic actuator of FIG. 14.
Figure 15B:
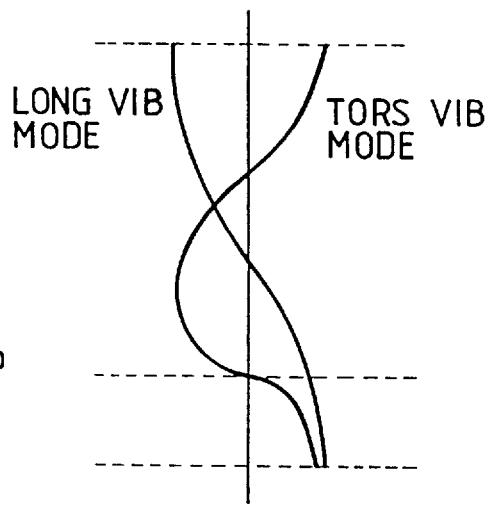
Figure 16:
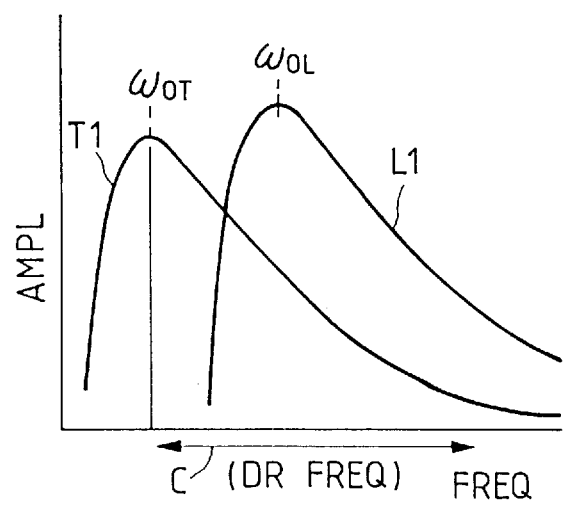
FIG. 16 is a graph for explaining the state where the resonance frequency of torsional vibration becomes higher than that of longitudinal vibration in a conventional ultrasonic actuator.
Figure 17:
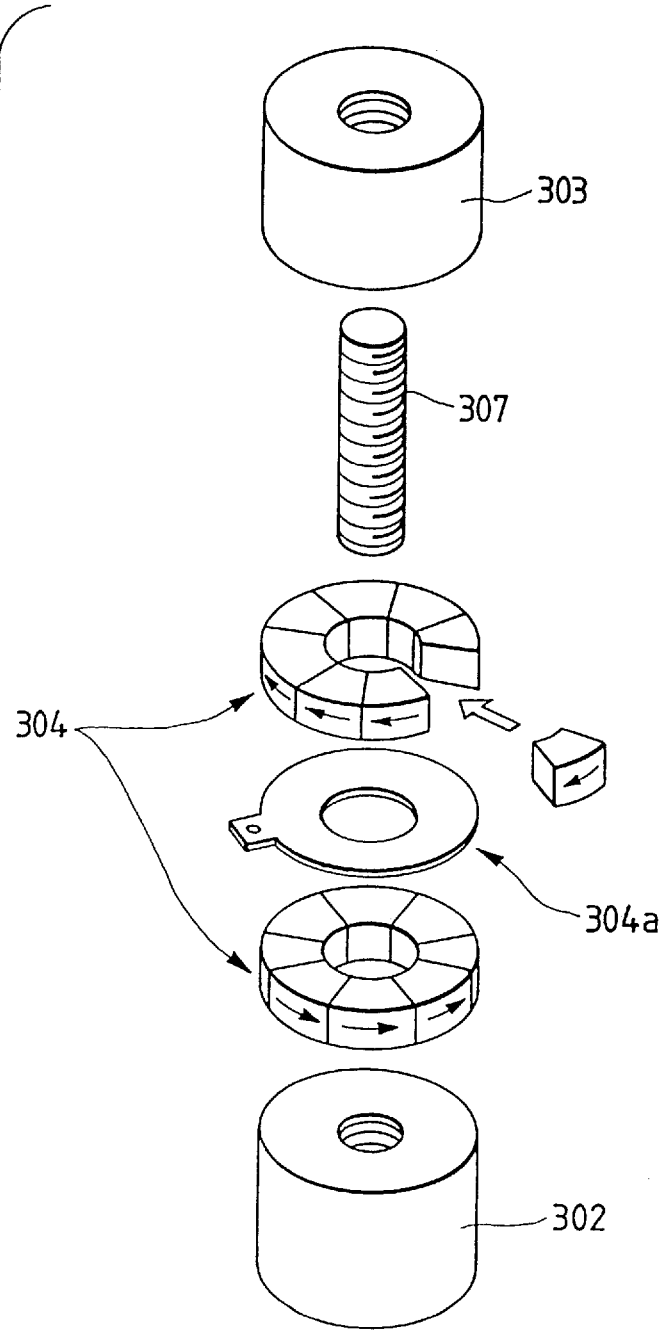
FIG. 17 is an exploded view of a stator of a conventional longitudinal and torsional type ultrasonic actuator.
Figure 18:
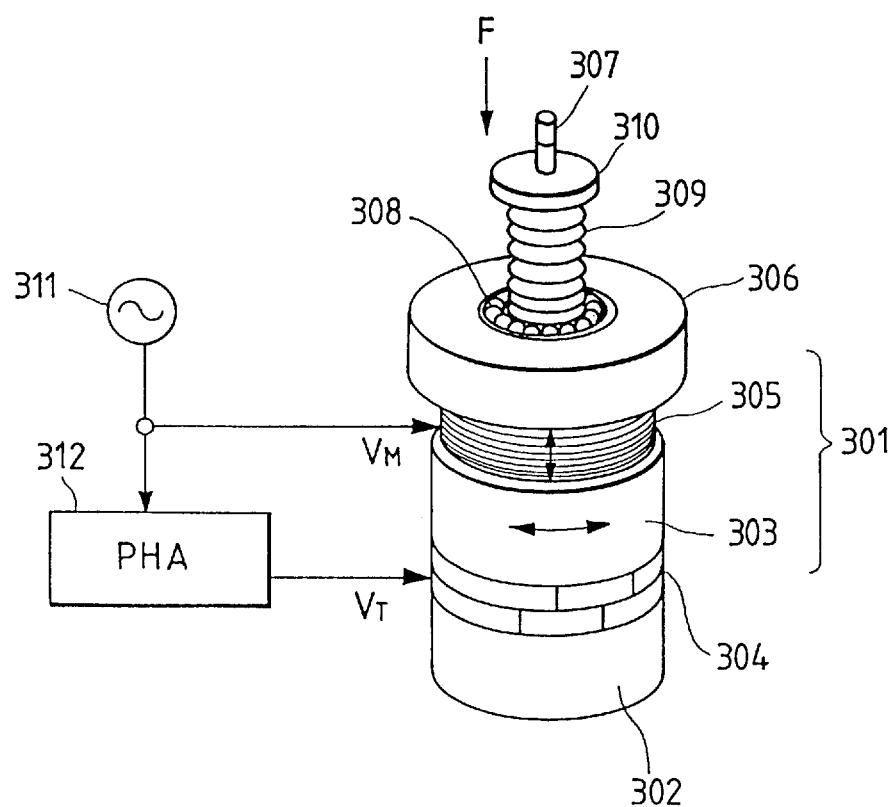
FIG. 18 is a perspective view showing the conventional ultrasonic actuator.

FIGS. 15A and 15B are diagrams for explaining the occurrence of the first longitudinal vibration and the second torsional vibration due to the excitation of the piezoelectric elements.

The principle of producing the torsional and longitudinal vibrations is the same as that in the previous embodiment. However, in this embodiment, the elastic members 152, 153 have the first thick portions 152a, 153a, the second thick portions 152c, 153c, and the thin portions 152b, 153b whose torsional rigidity is poor. Further, the length of the first thick portions 152a, 153a is larger than that of the second thick portions 152c, 153c. Therefore, in the torsional vibration, two nodes are produced in the thin portions 152b, 153b and in the intermediate portion of the first thick portions 152a, 153a, so the torsional vibration is a second mode.

On the other hand, since the longitudinal vibration is hardly affected by the configuration due to the thin portions 152b, 153b, one node is produced in the intermediate portion of the length including the first thick portions 152a, 153a, the thin portions 152b, 153b, and the thick portions 152c, 153c, so that longitudinal vibration is a first mode. In this case, the drive surface E becomes a loop in which each amplitude of the torsional and longitudinal vibrations is large.

In such an ultrasonic actuator, with respect to the change of length of the second thick portions 152c, 153c, the change of resonance frequency of the longitudinal vibration is larger than that of resonance frequency of the torsional vibration. Therefore, by changing the length of the second thick portions 152c, 153c, it is possible to make the resonance frequency of the torsional vibration coincide with that of the longitudinal vibration or to make the resonance frequency of the torsional vibration higher than that of the longitudinal vibration.

(MANUFACTURE EXAMPLES)

The ultrasonic actuator utilizing the longitudinal and torsional vibration double-mode degenerating type rotor was actually designed. Also, the stator 151 was formed of two different materials respectively for the elastic members 152, 153, and the piezoelectric elements 154, 155. Also, the elastic members 152, 153 were shaped to have the thick and thin portions. Further, in order to improve calculation accuracy, the resonance frequencies of the torsional and longitudinal vibrations were obtained by the finite element method.

| | |
|---|---|
| The elastic member 152, 153 | stainless steel |
| The piezoelectric element 154 for torsional vibration | PZT with a thickness of 0.5 mm, $d_{15} = 510 \times 10^{-12}$ m/V |
| The piezoelectric element 155 for longitudinal vibration | PZT with a thickness of 0.5 mm, $d_{31} = -135 \times 10^{-12}$ m/V |

Manufacture Example 3

| | |
|---|---|
| The length of the first thick portion | 20 mm |
| The length of the thin portion | 1 mm |
| The length of the second thick portion | 4 mm |
| The resonance frequency of longitudinal vibration | 72.9 kHz |
| The resonance frequency of torsional vibration | 73.4 kHz |

Manufacture Example 4

| | |
|---|---|
| The length of the first thick portion | 20 mm |
| The length of the thin portion | 1 mm |
| The length of the second thick portion | 3 mm |
| The resonance frequency of longitudinal vibration | 81.7 kHz |
| The resonance frequency of torsional vibration | 77.5 kHz |

Thus, by adjusting the length of the second thick portions 152c, 153c, it was possible to make the resonance frequency of the torsional vibration higher than that of the longitudinal vibration.

Next, the operation of the ultrasonic actuator of this embodiment will be described. It is to be noted that the drive circuit is the same as that in the previous embodiment.

The oscillator generates a drive signal. The drive signal is divided by the phase shifter into two drive signals having the phase difference of $(1/4)\lambda$. The divided signals are amplified by the T-amplifier and the L-amplifier respectively. The drive signal amplified by the T-amplifier is input to the piezoelectric elements 154 for torsional vibration, while the drive signal amplified by the L-amplifier is input to the piezoelectric elements 155 for longitudinal vibration. When the drive signals are input to the stator 151, first longitudinal vibration and second torsional vibration occur owing to the excitation of the piezoelectric elements 154, 155, and elliptic motion composed of those vibrations is produced on the drive surface E of the stator 151. As the rotor 156 is pressed against the drive surface E of the stator 151, the drive force is transmitted frictionally from the stator 151 to the rotor 156, which is then driven.

Also, in this embodiment, the resonance frequency of the second torsional vibration is made higher than that of the first longitudinal vibration the same as in the previous embodiment. Thereby, the same effect as that in the previous embodiment can be obtained.

Further, in this embodiment, since the resonance frequencies of the torsional and longitudinal vibrations can be determined only by the stator, there is an advantage that the shape of the rotor can be selected freely. For that purpose, it is necessary to reduce propagation of the vibration from the stator to the rotor, but which can be achieved by utilizing a material with vibration damping ability for the slidable member or the base member.

The present invention is not limited to the above embodiments, and various modifications and changed can be taken.

Figure 13:
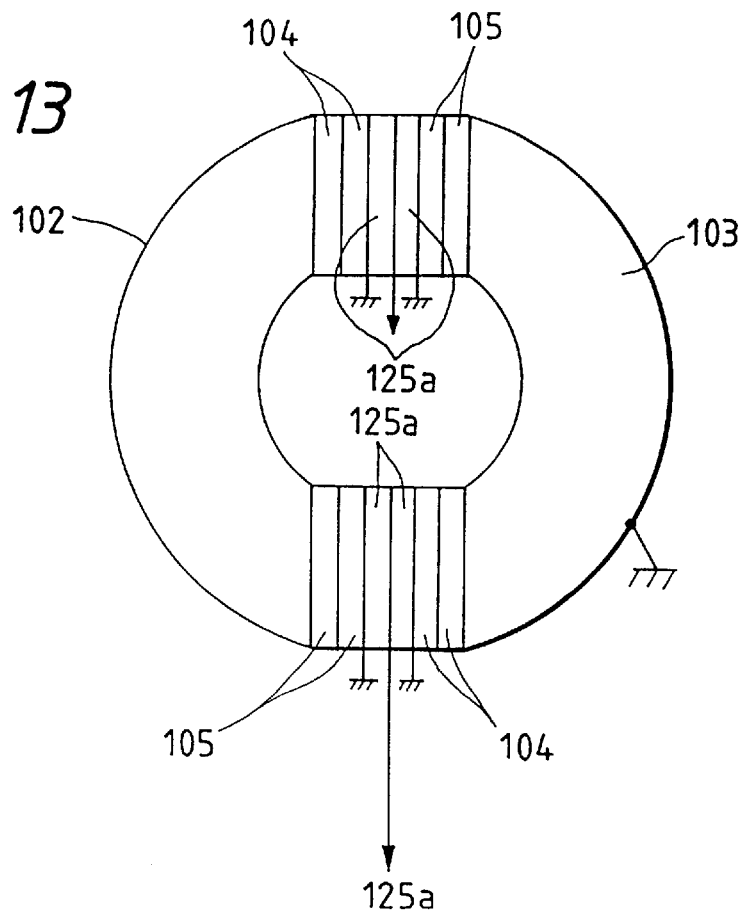
FIG. 13 is a diagram showing a modification of the stator of the ultrasonic actuator of FIG. 7.

For example, in FIGS. 9A and 9B, the piezoelectric element 125a for detection is attached to the side surface of the elastic member 102 (or 103), but may be sandwiched between the piezoelectric elements 104, 105, as shown in FIG. 13.

Also, in the above embodiments, although the vibration of the stator is detected by the piezoelectric element 125a, it may be detected by directly detecting the number of revolutions of the rotor by means of an encoder or the like and sending the detection results to the controller 126.

In the above embodiments, the electromechanical converting elements are the piezoelectric elements, but may be electrostrictive elements or the like.

Furthermore, in the above embodiments, the case where the first torsional vibration mode and the first longitudinal mode occur in the elastic members and the case where the second torsional vibration mode and the first longitudinal vibration mode occur in the elastic member are described. However, even though an m-th torsional vibration mode and an n-th longitudinal vibration mode are made to occur in the elastic members, the same effect can be obtained if the resonance frequency of the longitudinal vibration<that of the torsional vibration.

According to the present invention, since the resonance frequency of the m-th torsional vibration is made higher than that of the n-th longitudinal vibration and the actuator is driven at a frequency higher than the resonance frequency of the torsional vibration, it is possible to achieve stable drive performance and to improve the drive force and drive efficiency. Also, the variation in performance of formed actuators can be reduced.

Further, as the n-th longitudinal vibration is first longitudinal vibration and the m-th torsional vibration is second torsional vibration, it is possible to make each vibration amplitude large, so the drive force can be improved.

Furthermore, the actuator is driven at a frequency within a range higher than the resonance frequency of the m-th torsional vibration, so that it is possible to drive the actuator constantly in the vicinity of the higher frequency among the two resonance frequencies and the stable drive can be achieved.

What is claimed is:

1. An ultrasonic motor comprising:

a vibrator for vibrating with a first vibration mode and a second vibration mode for vibration in a direction different from that of said first vibration mode;

a relative moving element to execute relative motion in accordance with the vibration of said vibrator; and a drive control device to control said vibrator;

wherein in said first vibration mode, a vibration is made substantially along a direction coincident to the direction of the relative motion, and in the second vibration mode, a vibration is made substantially along a direction perpendicular to the vibration direction in the first vibration mode, and wherein a resonance frequency of the first vibration mode is higher than a resonance frequency of said second vibration mode, and said drive control device controls said vibrator at a frequency range higher than the resonance frequency of said first vibration mode so as to synthesize said first vibration mode and said second vibration mode to generate an elliptical motion.

2. An ultrasonic motor comprising:

a relative moving member;

an elastic member to drive said relative moving member;

an electromechanical converting device attached to said elastic member; and a drive control device to control said electromechanical converting device, wherein said electromechanical converting device vibrates in accordance with an input frequency voltage to produce a longitudinal vibration and a bending vibration in said elastic member; the vibrations of said elastic member are composed to produce elliptic motion in said elastic member to cause said relative moving member to execute relative motion with respect to said elastic member; said drive control device inputs to said electromechanical converting device, said frequency voltage having a frequency greater than or equal to a resonance frequency of the longitudinal vibration, wherein the resonance frequency of the longitudinal vibration is higher than a resonance frequency of the bending vibration, and wherein said longitudinal vibration vibrates in a direction substantially parallel to the relative motion.

3. An ultrasonic motor according to claim 2, wherein said drive control device changes said frequency of said frequency voltage input to said electromechanical converting device from a high frequency toward a low frequency at the time of driving said motor.

4. An ultrasonic motor comprising:

a relative moving member;

an elastic member to drive said relative moving member;

an electromechanical converting device attached to said elastic member; and a drive control device to control said electromechanical converting device, wherein said electromechanical converting device vibrates in accordance with an input frequency voltage to produce a longitudinal vibration and a bending vibration in said elastic member;

the vibrations of said elastic member are composed to produce elliptic motion in said elastic member to cause said relative moving member to execute relative motion with respect to said elastic member;

said drive control device inputs to said electromechanical converting device, said frequency voltage having a frequency greater than or equal to a resonance frequency of the longitudinal vibration, wherein the resonance frequency of the longitudinal vibration is higher than a resonance frequency of the bending vibration, wherein said drive control device further includes a phase difference detecting section to output a phase difference detection signal in accordance with the phase difference between said input voltage and a monitored voltage;

a target phase difference setting section to output a target phase difference signal corresponding to a target output; and a phase difference control section to compare the outputs of said phase difference detecting section and control said phase difference detecting signal so as to approach said target phase difference signal, and said target phase difference setting section sets said target phase difference signal to be within a range higher than a resonance point of the higher resonance frequency among said resonance frequencies of said vibration modes.

5. A method of driving an ultrasonic motor in which a frequency voltage is input to an electromechanical converting device to produce a longitudinal vibration and a bending vibration in an elastic member attached to said electromechanical converting device, and the vibrations of said elastic member are composed to produce elliptic motion in said elastic member to cause a relative moving member to execute relative motion with respect to said elastic member, said method comprising the step of:

setting said frequency voltage to be input to said electromechanical converting device so as to have a frequency greater than or equal to a resonance frequency of the longitudinal vibration, wherein the resonance frequency of the longitudinal vibration is higher than a resonance frequency of the bending vibration, and wherein said longitudinal vibration vibrates in a direction substantially parallel to the relative motion.

6. An ultrasonic motor comprising:

a relative moving member;

an elastic member to drive said relative moving member;

an electromechanical converting device attached to said elastic member; and a drive control device to control said electromechanical converting device, wherein said electromechanical converting device vibrates in accordance with an input frequency voltage to produce a longitudinal vibration and a torsional vibration in said elastic member; the vibrations of said elastic member are composed to produce elliptic motion in said elastic member to cause said relative moving member to execute relative motion with respect to said elastic member; said drive control device inputs to said electromechanical converting device, said frequency voltage having a frequency greater than or equal to a resonance frequency of the torsional vibration, wherein the resonance frequency of the torsional vibration is higher than a resonance frequency of the longitudinal vibration, and wherein said torsional vibration vibrates in a direction substantially parallel to the relative motion.

7. A method of driving an ultrasonic motor in which a frequency voltage is input to an electromechanical converting device to produce a longitudinal vibration and a torsional vibration in an elastic member attached to said electromechanical converting device, and the vibrations of said elastic member are composed to produce elliptic motion in said elastic member to cause a relative moving member to execute relative motion with respect to said elastic member, said method comprising the step of:

setting said frequency voltage to be input to said electromechanical converting device so as to have a frequency greater than or equal to a resonance frequency of said torsional vibration, wherein the resonance frequency of the torsional vibration is higher than a resonance frequency of the longitudinal vibration, and wherein said torsional vibration vibrates in a direction substantially parallel to the relative motion member.

8. An ultrasonic motor according to claim 6, wherein said drive control device includes a controller that compares a monitoring output relating to a vibration state of the torsional vibration, with a predetermined target value, and controls the monitoring output so that the monitoring output approaches the target value.

* * * * *